Nov. 14, 1950 — M. B. LEVOY — 2,529,879
OPHTHALMIC MOUNTING
Filed April 3, 1948 — 3 Sheets-Sheet 1
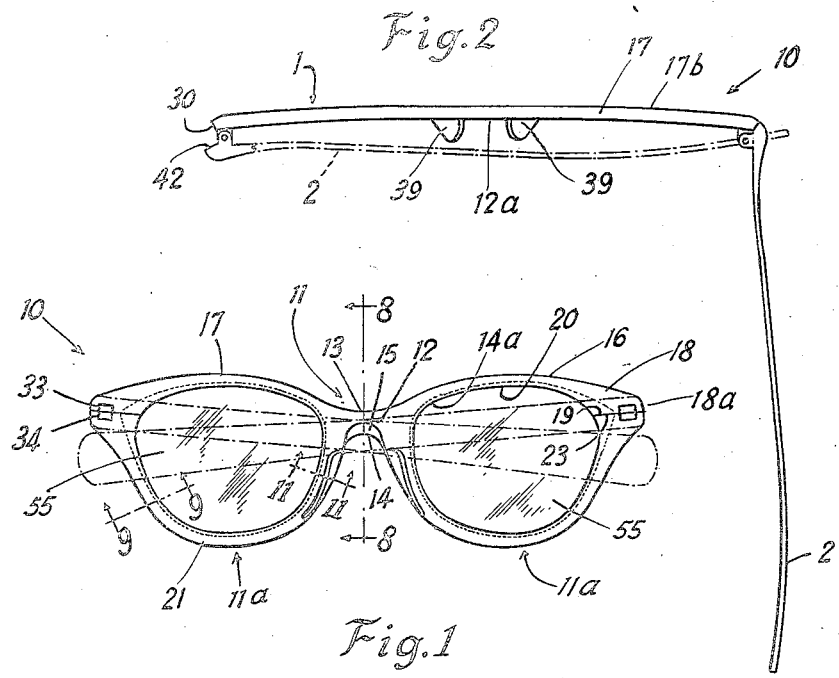
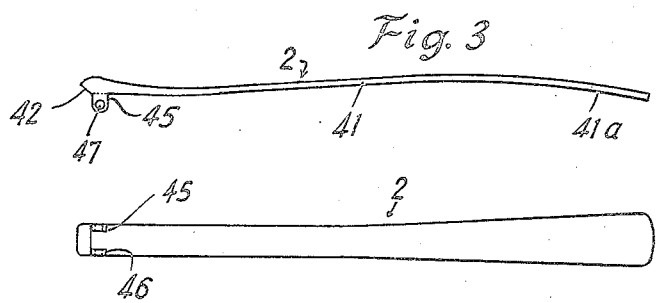
Inventor
Monroe B. Levoy
Attorney Nov. 14, 1950     M. B. LEVOY     2,529,879
OPHTHALMIC MOUNTING
Filed April 3, 1948     3 Sheets-Sheet 2

Inventor
Monroe B. Levoy
By J. B. Felshin
Attorney

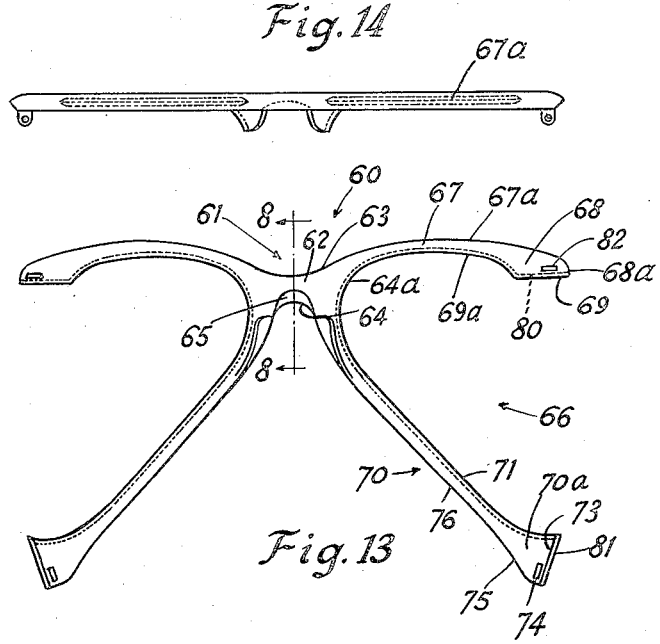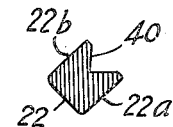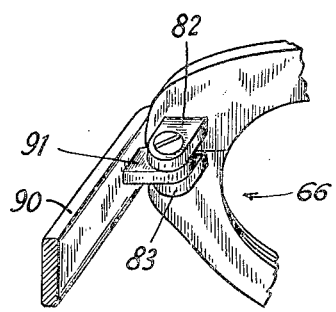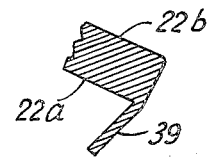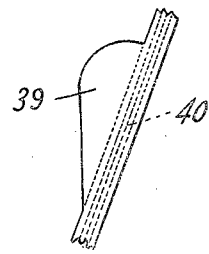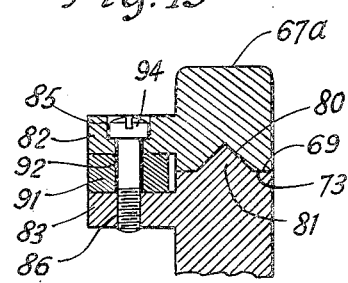

Patented Nov. 14, 1950

2,529,879

UNITED STATES PATENT OFFICE 2,529,879

OPHTHALMIC MOUNTING

Monroe B. Levoy, Newtown, Conn.

Application April 3, 1948, Serial No. 18,840

1 Claim. (Cl. 88—41)

This invention relates to ophthalmic mountings such as lorgnettes, oxfords, spectacles, eyeglasses and industrial goggles.

Ophthalmic frames made of plastic are readily formed by molding procedures. However, such frames must include metal hinges for mounting temple bars on the front. This in turn involves the necessity of riveting hinge elements to rim portions of the front and to the front ends of the temple bars. It is not possible to integrally mold hinge elements or lugs on the plastic frames, since such elements would not not have the necessary strength.

Accordingly, it is an object of this invention to provide an improved ophthalmic mounting or frame which comprises a front and temple bars which are in the form of integral die cast members of a metal selected for its lightness and pliability, said front and temple bars including as integral portions thereof, cast attaching lugs.

Another object of this invention is to provide an ophthalmic frame or mounting formed from a metal or metal alloy blank which is distinguished by its lightness, pliability and strength. More particularly, such mounting may be made by die casting the metal or metal alloy to produce an integral blank which includes split lens or rim portions interconnected by a bridge portion, the rims being formed with projecting integral lugs for hinging temple bars thereto. The metal used is such as will lend itself to surface treatments for producing colored ornamental effects and bending and shaping operations incident to the fitting of the frame.

Yet another object of this invention is to provide an ophthalmic mounting formed by die casting an integral blank of pliable metal or metal alloy which lends itself to surface coloring or ornamentation by means of plating, anodizing, or lacquering processes, said die cast blank including a pair of split rims interconnected by a bridge, the outer end portions of the rims being slightly spaced from each other and having integral temple attaching lugs extending therefrom. The rims are adapted to be milled after casting, to form lens receiving grooves therein. When the blank is anodised and colored, the finish is not affected by the bending operations which are necessary to bring the spaced split portions of the rims into abutment with each other.

A further object of this invention is to provide in an article of the character described, a cast ophthalmic frame of pliable metal which includes an integral front, a pair of split rims interconnected by a bridge, the rims having integral temple attaching lugs disposed at the ends of the split portions thereof and aligned with each other, and temple bars cast of similar metals, which are formed with spaced integral lugs adapted to be disposed on either side of the lugs on the lens rims and in aligned relation thereto, said aligned lugs being formed with registering through openings, and means disposed in the registering openings in said lugs for interconnecting the split end portions of said rims in abutting relation and pivotally attaching to the rims said temple bars, said interconnecting and pivot means being formed of a metal harder than the metal of which said frame and temple bars is formed, the metal of which the front and temple bars are formed being pliable at room temperature so as to permit the shaping and bending of portions of both front and temple bars, as an incident to the fitting of the ophthalmic frame, and to retain the shaped or bent form when so bent.

Still a further object of this invention is to provide an ophthalmic mounting in the form of a cast light metal blank, including a pair of split rim portions interconnected by a bridge portion, the split ends of said rim portion being adjacent each other and formed with integral temple attaching lugs, the opposed ends of the split rim portions being formed with longitudinal complementary tongue and groove portions, the blanks being adapted to be milled to form lens receiving grooves in the rim portions, the split portions of said rims being adapted to be bent to bring the opposed ends thereof into abutment with each other and the complementary tongue and grooved portions into interengaging relation whereby the ends of the lens receiving grooves in the split rims are brought into accurate registering relation and the integral lugs are brought into alignment with each other.

Yet another object of this invention is to provide an ophthalmic mounting which shall be relatively inexpensive to manufacture, which shall lend itself to quick assembly of its parts, which shall be readily ornamented, which shall be readily fitted without the need for special tools, and will provide a mounting which is light, comfortable to the wearer, pleasing in appearance, and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claim.

In the accompanying drawings in which is shown various illustrative embodiments of this invention, Fig. 1 is a rear elevational view of the ophthalmic mounting, showing the temple bars in dotted outline, made in accordance with an embodiment of this invention;

Fig. 2 is a top view thereof;

Fig. 3 is a top plan view of the temple bar;

Fig. 4 is a side elevational view of the temple bar;

Fig. 8 is a sectional view taken on the line 8—8 of Fig. 5;

Fig. 9 is a sectional view taken on the line 9—9 of Fig. 5;

Fig. 11 is a sectional view taken on the line 11—11 of Fig. 1;

Fig. 12 is an end view of the side supporting portion of the bridge of the blank shown in Fig. 5;

Fig. 13 is a rear elevational view of an ophthalmic mounting blank and illustrating a modified form of the invention;

Fig. 14 is a top plan view of the blank shown in Fig. 13;

Fig. 15 is an enlarged perspective view showing the hinged connection between the abutting outer ends of the rim portions of the blank shown in Fig. 13, and an associated temple bar;

Fig. 16 is an enlarged cross sectional view showing the joint between the abutting ends of the rim portions of the blank shown in Fig. 13 and the associated temple bar.

Figure 6:
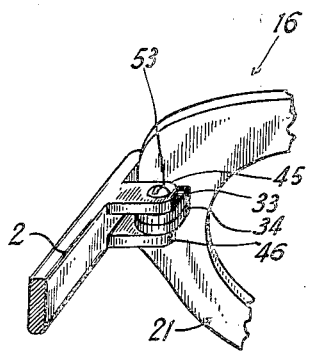
Fig. 6 is an enlarged perspective view showing the hinged connection of the temple bars and the abutting ends of the lens rim.

Referring now in detail to the drawings, 10 designates an ophthalmic mounting or frame embodying the invention. The same comprises a front 1 with temple bars 2 hinged thereto.

The front 1 comprises a central bridge portion 11 on either side of which is symmetrically disposed and integrally connected thereto, rim or lens receiving portions generally designated as 11a.

The bridge 11 comprises a central portion 12 having a face 12a, a concavely curved upper edge 13, a concavely curved lower edge 14, and curved side edges 14a. The face 12a is formed with a downwardly inclined nose support surface 15 which extends to the lower edge 14.

Extending outwardly from either side of the bridge 11 and integral therewith are the lens carrying or rim portions 11a. Each of the portions 11a comprises an outwardly extending upper arm 16 of generally rectangular cross section. The arm 16 comprises a convexly curved top edge 17 and parallel faces 17a, 17b, extending downwardly from said edge. The outer end portion 18 of arm 16 is enlarged and comprises a vertically disposed end edge 18a extending downwardly from the edge 17, and an inwardly and longitudinally extending edge 19. The arm 16 further comprises a curved bottom edge 20 extending from the inner end of edge 19 to the upper end of curved edge 14a on the central portion 12.

The rims 11a further comprise curved lower arms 21 which extend outwardly of the central portion 12 of bridge 11. The arms 21 have a transverse cross section similar to that of arms 16 and comprise a curved bottom edge 22 and parallel faces 22a, 22b, extending from edge 22. The arms 21 further comprise enlarged outer end portions 23 complementary to enlarged portions 18 on arms 16. The enlarged portion 23 comprises an outwardly curved edge 23a extending from edge 22 and an edge 24 extending from edge 23a. Extending transversely and inwardly from edge 24 is a longitudinally disposed edge 25 which is complementary to edge 19 on arm 16. The arm 21 further comprises a curved inner edge 26 which extends from the inner end of edge 25 to the lower end of curved edge 14a.

The edge 19 on arm 16 is formed with a longitudinally extending groove 27 which extends from edge 18a to edge 20. Edge 25 on arm 21 is formed with a longitudinally extending rib or tongue 28 complementary to groove 27 and which extends from edge 24 to edge 26.

When the end portions 18, 23, are in abutting relation, the edges 18a, 24, thereof are in vertical alignment. The edges 18a, 24 are bevelled as at 30 towards the surfaces 17a, 22a for the purpose hereinafter appearing.

Extending from end portions 18 on the arms 13 are integral temple attaching lugs 33 projecting outwardly of face 17a. The lower longitudinal edge of the lugs are coextensive with the edge 19 on the arms. Similar lugs 34 are disposed on the arms 21 with their upper edges coextensive with edge 25 thereof. The lugs 33, 34 are disposed inwardly of the edges 18a, 24 on the end portions 18, 23 respectively. The lugs are adapted to abut each other when the arms 21 are bent upwardly to bring the edges 25 thereof into abutment with edge 19 on arm 16, the rib 28 becoming engaged in groove 27, as shown in Fig. 7. The interengaging tongue and groove prevent relative movement of the abutting arm portions in directions normal to the frame front. The lugs 33, 34 are formed with through openings 35, 36, respectively, which are adapted to register when the outer ends of the arms 16, 21 abut each other.

Projecting from the upper ends of edges 22 on arms 21 adjacent the curved edge 14 are integral triangular shaped nose rests 39 which are suitably curved. After the front 1 has been cast the rim portions 11a thereof are milled on the edges 20, 14a, 26, to form lens receiving grooves 40.

There is further provided a pair of temple bars 2 for hinged attachment to the front 1. Each of the bars 2 may be cast from metal or metal alloy similar to that of which front 1 is made. The bars 2 comprise elongated members 41 which have a greater width than thickness and include flared inwardly curved end portions 41a at the rear end and transverse bevelled edges 42 at the front end thereof. The front end of the bars also comprise integral spaced horizontally disposed, attaching lugs 45, 46 which are formed with aligned through openings 47, 48 respectively. The lugs 45, 46 are disposed adjacent the bevelled edges 42.

In assembling the temple bars 2 with front 1, the lugs 45, 46 on the bars are disposed on either side of the lugs 33, 34 on the rim portions of the front. The openings in the superposed lugs are then in registered relation. A bushing 50 flanged at one end is disposed in the opening 48 in the lugs 46, with the flange portion thereof abutting the lower edge of the lug. The bushing 50 has an externally knurled outer surface 51 and an internally threaded surface 52 which is adapted to receive a screw 53 having its head abutting the upper edge of lug 45, as shown in Fig. 7. The bushing and screw hold the abutting ends of the rim portions together as well as forming a hinge means for the temple bars 2 relative to the rim portions 11a. The bushing 50 may be made of a metal such as steel or the like which is harder than the cast metal of which the frame and temple bars are made. In this form of hinged construction, there is no need to form the lugs with threaded openings which would be subject to wear. The wear incident to the hinged movement of the temple bars relative to the front, is concentrated in the hard metal bushings which are resistant to such wear. The knurled surface 51 on the bushing 50 prevents the bushing from turning in the lugs while the screw 53 is being screwed into the threaded portion of the bushing. The head of screw 53 spans the opening 47 in lug 45.

The mounting 10 is adapted to receive lenses 55 which may be inserted into the lens grooves 40 in the lens portions 11a.

The vertically disposed bevelled ends 39 on outer edge portions of the arms 16, 21 will accommodate the beveled ends 42 of temple bars 41, when the bars are in extended position.

Figure 5:
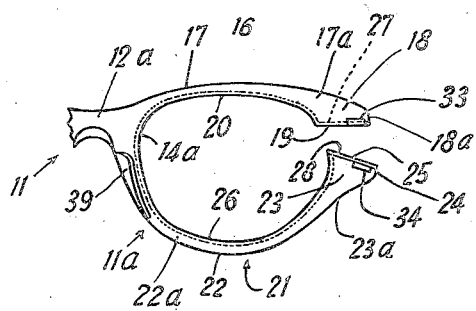
Fig. 5 is a rear elevational view of a portion of the front used in the mounting shown in Fig. 1.

The front 1 may be formed by die casting a light metal or metal alloy in the form of a single member shown in Fig. 5. The front will then include as integral parts thereof the bridge portion, rims, nose rest, and temple attaching lugs. The blank may be of cast aluminum or an alloy which comprises aluminum and magnesium wherein the magnesium content can range up to 6%. An alloy having a magnesium content of 4% is particularly adapted for making frames embodying the invention. Such an alloy is distinguished by its lightness, strength and ductility. Such an alloy has the weight of about .092 pound per cubic inch, a tensile strength of 35,000 pounds per square inch, and a yield strength of 20,000 pounds per square inch. The alloy is ductile and pliable at room temperature. The resultant blank is readily processed to ornament the same electrolytically anodising the blank and applying dye or pigment to the treated surface. Alternatively, the blank may be electroplated with gold, silver or rhodium to produce a desired finish. The blanks may also be ornamented by means of sprayed lacquer coatings. The temple bars 2 are similarly cast as integral members and similarly ornamented.

The anodised and colored blank is readily bent to bring the outer ends of arms 21 into abutment with the outer ends of the arms 16. The complementary rib and groove on the meeting portions of the arms, accurately register the arms relative to each other and prevents movement thereof in directions at right angles to the linear edges 19, 25 thereof. Additionally, the interengaging rib and groove on the abutting portions of the arms serves as means for registering the ends of the groove 40 on the arms 16, 23 as well as aligning the temple attaching lugs 33, 34.

It is noted that the ornamental coatings on the blank are not cracked or fractured, despite the bending of the arms into abutting relation. The ductility and pliability of the metals and metal alloys used in making both front and temple bars permit the shaping and bending of various portions of the mounting at room temperatures when the mounting is being fitted.

It is understood that in casting the blank 10, the curvature of the arms 16, 21 is predetermined so as to conform to the curvature of the lens 55, subsequently inserted in the lens receiving grooves 40 of portions 11a.

The relative position of the aligned lugs 33, 34 on the front and the lugs 44, 45 on the temple bars will determine the inclination of the temple bars to the front in both extended and folded positions. As shown in Figs. 1 and 2 the bars are positioned in crossed relation when in folded position.

Figure 7A:
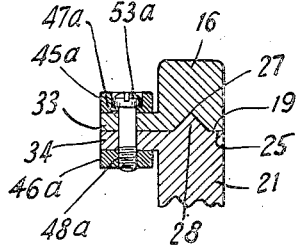
Fig. 7a is an enlarged cross sectional view similar to Fig. 7 and illustrating a modified construction.
Figure 7:
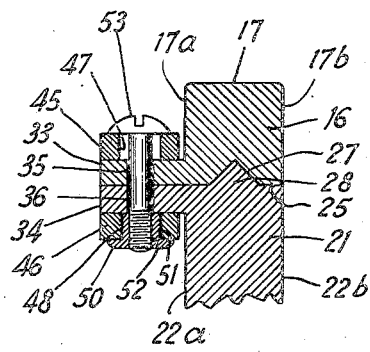
Fig. 7 is an enlarged cross sectional view showing the joint between the abutting outer end portions of the rims and the temple bars shown in Fig. 6.

In Fig. 7a is shown an alternative construction for hinging the temple bars to the frame, similar to that shown in Fig. 7 except as hereinafter described. The temple bar is provided with lugs 45a and 46a. Lug 45a is formed with a counterbored through opening 47a and lug 46a is formed with a threaded opening 48a. The temple bars are mounted on the frame so that the lugs 45a and 46a are disposed on either side of lugs 33, 34 on the frame and with openings in the lugs in registering relation. A headed pivot screw 53a is screwed into the threaded lug 46a, thus hingedly interconnecting the temple bars to the frame, as well as securing the abutting ends of the arms 16, 23 together.

In Figs. 13, 14, 15 and 16 is shown an embodiment of the invention and illustrating a modification thereof. The same comprises a front blank 60 which includes a bridge 61 similar to bridge 11 previously shown. The bridge 61 includes a central portion 62 and curved edges 63, 64 and 64a as well as an inclined surface 65 corresponding to parts 12, 13, 14, 14a and 15, respectively, as previously described. The blank 60 comprises rim portions 66 which include curved upper arms 67 having upper edges 67a and enlarged end portions 68. The end portion 68 includes an end edge 68a from which there extends a longitudinal edge 69. The arm 67 further comprises curved lower edges 69a which merge at the inner ends thereof with curved edge 64a. The rim portions 66 further comprise lower arms 70 which extend downwardly and outwardly from the lower end of curved edges 64a at either side of the central portion 61.

The arms 70 comprise an enlarged outer end portion 70a which includes an inner edge 71 extending from the lower portion of curved edge 64a and terminating in an upwardly curved edge portion 72. A linear edge 73 extends from edge 72 transversely thereof. The edge 73 is complementary to edge 69 on arm portion 68. From edge 73 there extends transversely thereof an edge 74. An upwardly and inwardly inclined edge 75 extends from edge 74 and from which there extends an outer edge 76 parallel with inner edge 71.

The end portion 68 on arm 67 is formed with a longitudinal groove 80 on edge 69 and end portion 70a is formed with a longitudinal rib or tongue 81 on edge 73 which is complementary to the groove.

The arm portion 63 includes an integral temple attaching lug 82 projecting therefrom slightly above edge 69. Arm 70 includes a similar lug 83 spaced below edge 74 and adapted to clip itself with lug 82 when arm 70 is suitably bent as hereinafter described. The lug 82 is formed with a counterbored opening 85 and lug 83 is formed with a threaded opening 86 adapted to be aligned with opening 85.

The blank 60 may be die cast as an integral member from a light metal such as aluminum or the aluminum-magnesium alloy previously described. Simultaneously with the die casting operation, the blank is formed on the edges 72, 64a, 69a of rim portions 66, with a continuous lens groove 87.

The blank thus formed may be anodised and colored, electroplated or lacquered, in the manner previously described.

The blank 60 is then converted into a front by bending the arms 70 in suitable curved form, bringing the edge 73 thereof into abutting relation to edges 69 on arms 67. The ribs 81 on arms 70 will then become engaged in groove 80 on arm 67.

With the blank 60 in suitably bent front form, temple bars 90 may be hingedly attached thereto. The bars 90 are provided at the front end projecting from the inner face thereof, with a lug 91 formed with a through opening 92. The bars are mounted on the frame with the lug 91 disposed between lugs 82, 83. The opening 92 in the lug 91 will then register with openings 85, 86 in lugs 82, 83 respectively. A headed pivot screw 94 secures the abutting ends of arms 67 and 70 together and additionally interconnects the temple bars 90 with the frame, the screw being screwed into the threaded opening 86 in lug 83.

Figure 17:
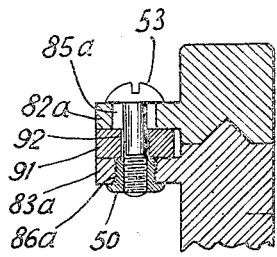
Fig. 17 is an enlarged cross sectional view similar to that of Fig. 16 and illustrating a modified construction.
Figure 10:
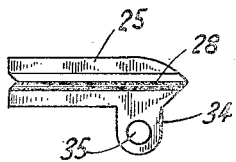
Fig. 10 is an enlarged top view of an end portion of the lower arm of the blank shown in Fig. 5.

As shown in Fig. 17, the temple bars may be hinged to the frame by means of a flanged bushing 50 and screw 53, in the manner previously described, to avoid the necessity of threading the openings in the lugs. As shown in the figure, the lugs 82a, 83a on the arms of the frame are formed with aligned through openings 85a and 86a respectively. The lug 91 on the temple bar is positioned between lugs 82a, 83a, the opening 92 therein registering with openings 85a, 86a. The flanged threaded bushing 50 is inserted in the opening 86a in lug 83a and the screw 53 is received in the bushing to hingedly interconnect the bars and frame.

The mountings may be made by die casting the front and temple bars from zinc or zinc alloys. Such blanks may be electroplated with gold, silver, rhodium or the like, to provide the same with an ornamented finish. Alternately, the cast zinc blanks may be ornamented with lacquered coatings.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings, is to be interpreted as illustrative and not in a limiting sense.

This application is a continuation in part of application Serial No. 733,555, filed March 10th, 1947, now abandoned.

Having thus described my invention, what I claim as new and desire to protect by Letters Patent of the United States, is:

Spectacles comprising a frame formed of cast malleable aluminum and having a bridge and lens receiving rims integral therewith and extending from opposite sides of the bridge, said rims each consisting of upper and lower arms curved longitudinally and having inner ends merging into each other and adjoining side portions of the bridge, the outer ends of the arms being free from each other and inwardly increasing in width and forming enlarged outer end portions having elongated inner edge faces, said inner edge faces being one formed intermediate its width with a rib extending its full length and the other with a rib-receiving groove, hinge ears formed integral with the enlarged end portions of said arms and extending rearwardly therefrom and formed with aligned openings, temples formed of malleable aluminum having front ends formed with integral hinge ears projecting laterally from their inner side faces and disposed in overlapping relation to the hinge ears of the arms and formed with openings registering with the openings therein, and fasteners passing through the registering openings and serving as pivot pins for the temples and as the sole means for the securement of the outer end portions of the upper and lower arms together with the ribs seated in the grooves and bracing the arms against movement relative to each other.

MONROE B. LEVOY.

REFERENCES CITED

The following references are of record in the file of this patent:

UNITED STATES PATENTS

| Number | Name | Date |
|---|---|---|
| 426,422 | Price | Apr. 22, 1890 |
| 710,015 | Schick | Sept. 30, 1902 |
| 752,944 | Anderson | Feb. 23, 1904 |
| 989,218 | Wells | Apr. 11, 1911 |
| 1,022,653 | Boucher | Apr. 9, 1912 |
| 1,171,419 | Fink | Feb. 15, 1916 |
| 1,779,789 | Wells | Oct. 28, 1930 |
| 1,953,922 | Bosworth | Apr. 10, 1934 |
| 2,210,507 | Spill | Aug. 6, 1940 |
| 2,225,625 | Ehrlich | Dec. 24, 1940 |

FOREIGN PATENTS

| Number | Country | Date |
|---|---|---|
| 369,904 | Great Britain | Mar. 29, 1932 |